United States Patent
Betts

(10) Patent No.: US 6,330,722 B1
(45) Date of Patent: Dec. 18, 2001

(54) PROTECTIVE HELMET RESTRAINT AND HEAD AND NECK STABILIZING SYSTEM

(75) Inventor: Richard M. Betts, Canoga Park, CA (US)

(73) Assignee: MCY III Trust, Los Angeles, CA (US)

( * ) Notice: Subject to any disclaimer, the term of this patent is extended or adjusted under 35 U.S.C. 154(b) by 0 days.

(21) Appl. No.: 09/756,943

(22) Filed: Jan. 9, 2001

(51) Int. Cl.$^7$ .......................................... A42B 3/00
(52) U.S. Cl. ...................................... 2/416; 2/421
(58) Field of Search ................................ 2/410, 425, 416, 2/421, 411, 468; 280/290; 244/122 AG

(56) References Cited

U.S. PATENT DOCUMENTS

| | | | |
|---|---|---|---|
| 3,925,822 | * | 12/1975 | Sawyer . |
| 4,909,459 | * | 3/1990 | Patterson . |
| 5,272,770 | * | 12/1993 | Allen et al. . |
| 5,437,613 | * | 8/1995 | Reggio et al. . |
| 6,009,566 | * | 1/2000 | Hubbard . |

FOREIGN PATENT DOCUMENTS

2626148 * 7/1989 (FR) .

* cited by examiner

*Primary Examiner*—Rodney M. Lindsey
(74) *Attorney, Agent, or Firm*—Thomas I. Rozsa; Tony D. Chen; Jerry Fong

(57) ABSTRACT

A helmet restraint and head and neck stabilizing system for use with a helmet worn by an operator or occupant of a land vehicle, boat, airplane or other motion apparatus, in conjunction with a shoulder belt system or a suit worn by the operator or occupant. The helmet restraint and head and neck stabilizing system preferably includes two end connecters, two releasable buckles, two flexible end belts, and a flexible middle belt. The two end connecters are separately attachable to the shoulder belt system or the suit worn by the operator or occupant on opposite sides of the helmet worn by the operator or occupant. The two end belts each have one end affixed to one end connecter and an opposite end connected to one buckle, respectively. The middle belt has one end connected to one buckle and an opposite end connected to the other buckle. The length of the first or second end belt or the middle belt is adjustable. The helmet restraint and head and neck stabilizing system also includes fastener members for removably attaching the middle belt to the helmet.

78 Claims, 3 Drawing Sheets

PROTECTIVE HELMET RESTRAINT AND HEAD AND NECK STABILIZING SYSTEM

BACKGROUND OF THE INVENTION

1. Field of the Invention

The present invention relates generally to the field of personal safety and protection devices. More particularly, the present invention relates to the field of protective harness systems used in land vehicles, boats, airplanes or other motion apparatus.

2. Description of the Prior Art

Helmets are widely used in vehicles and other motion apparatus for protection of the head of the driver or other occupants thereof. However, while a helmet may provide certain protection to a wearer's head from injuries cause by hitting on other objects, it is often inadequate to prevent the violent motion of the head and the bending of the neck of the wearer resulting from the momentum of a sudden impact.

For example, when a high speed race car has a collision, the helmet worn by the driver may protect the driver's head injuries caused by hitting the windshield. Unfortunately, a helmet will not prevent the driver's head from violently moving forward upon the momentum which may result in internal injury of the brain and also result in severe neck injuries.

Therefore, it is desirable to provide a protective helmet restraint and head and neck stabilizing system that restrains the movement of the helmet upon a sudden impact and therefore stabilizes the posture of the head and neck of the wearer of the helmet.

SUMMARY OF THE INVENTION

The present invention is a helmet restraint and head and neck stabilizing system for use with a helmet worn by an operator or occupant of a land vehicle, boat, airplane or other motion apparatus.

It is an object of the present invention to provide a helmet restraint harness system for use by an operator or occupant of a vehicle or other motion apparatus wearing a helmet.

It is also an object of the present invention to provide a helmet restraint harness system that can be quickly and easily installed and attached to the existing helmet worn by an operator or occupant oaf vehicle or other motion apparatus.

It is another object of the present invention to provide a helmet restraint harness system as a supplement to the existing shoulder belt system used by an operator or occupant of a vehicle or other motion apparatus.

It is a further object of the present invention to provide a helmet restraint harness system that can help stabilizing the user's head and neck upon a sudden impact.

Described generally, the present invention is a helmet restraint and head and neck stabilizing system for use with a helmet worn by an operator or occupant of a land vehicle, boat, airplane or other motion apparatus, in conjunction with a shoulder belt system or a suit worn by the operator or occupant. The helmet restraint and head and neck stabilizing system preferably includes two end connecters, two releasable buckles, two flexible end belts, and a flexible middle belt.

The two end connecters are separately attachable to the shoulder belt system or the suit worn by the operator or occupant on opposite sides of the helmet worn by the operator or occupant. The two end belts each have one end affixed to one end connecter and an opposite end connected to one buckle, respectively. The middle belt has one end connected to one buckle and an opposite end connected to the other buckle. The length of the first or second end belt or the middle belt is adjustable.

The helmet restraint and head and neck stabilizing system also includes fastener members for removably attaching the middle belt to the helmet.

The present invention helmet restraint and head and neck stabilizing system has many unique features and important advantages. It can be used by an operator or occupant of any land vehicles, boats, airplanes or other motion apparatus who wears a helmet. It can be quickly and easily affixed to an existing helmet worn by the user. It also acts as a supplement to the existing shoulder belt system used by the user. When used properly, it helps to prevent the user's head and neck from violent movement upon a sudden impact to avoid serious injuries.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
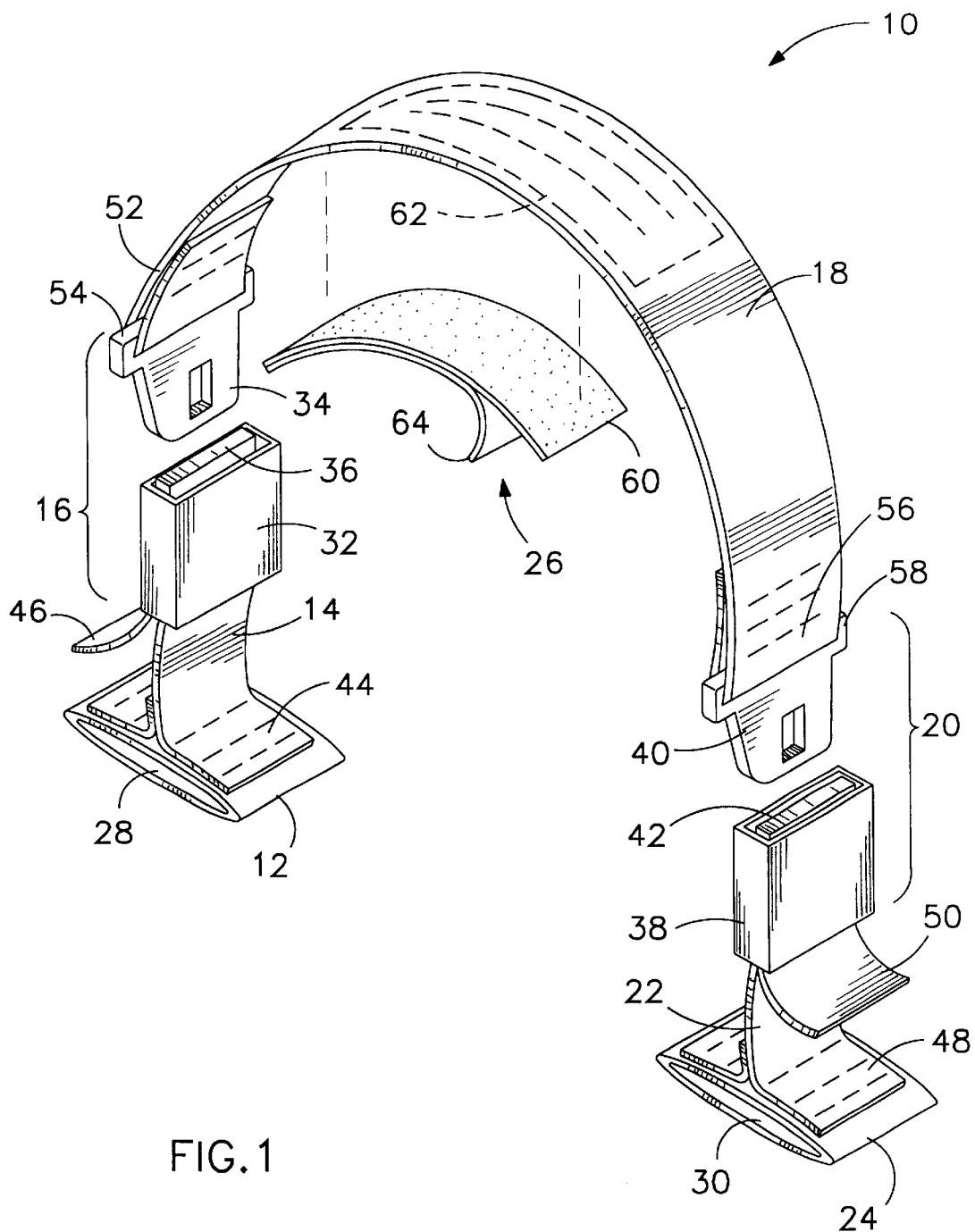
FIG. 1 is a perspective view of one of the preferred embodiments of the present invention helmet restraint and head and neck stabilizing system.

Referring to FIG. 1, there is shown at 10 a helmet restraint and head and neck stabilizing system for use with a helmet worn by an operator or occupant of a land vehicle, boat, airplane or other motion apparatus. The helmet restraint and head and neck stabilizing system 10 includes a first end connecter 12, a first flexible end belt 14, a first buckle 16, a middle flexible belt 18, a second buckle 20, a second flexible end belt 22, a second end connecter 24, and a helmet attachment device 26.

Preferably, the first end connecter 12 includes a flexible loop device 28 which can be wrapped around or sleeved over a portion of a first shoulder belt of a shoulder belt system. The first end connecter 12 may be made of fabric or leather materials, natural and/or synthetic, or any combinations thereof, or other like and/or suitable materials.

Similarly, the second end connecter 24 includes a loop device 30 which can be wrapped around or sleeved over a portion of a second shoulder belt of the should belt system. The second end connecter 24 may be made of fabric or leather materials, natural and/or synthetic, or any combinations thereof, or other like and/or suitable materials.

The first buckle 16 includes a first buckle housing 32 and a first buckle tongue 34 which may be inserted into, and locked in, first buckle housing 32. The first buckle tongue 34 may be released from the first buckle housing 32 by a release mechanism including, for example, a first buckle button 36. The first buckle 16 may be made of metal or plastic materials, or any combinations thereof, or other like and/or suitable materials.

Similarly, the second buckle 20 includes a second buckle housing 38 and a second buckle tongue 40 which may be inserted into, and locked in, second buckle housing 38. The second buckle tongue 40 may be released from the second buckle housing 38 by a release mechanism including, for example, a second buckle button 42. The second buckle 20 may be made of metal or plastic materials, or any combinations thereof, or other like and/or suitable materials.

The first end belt 14 interconnects the first end connecter 12 and the first buckle housing 32. One end 44 of the first end belt 14 is affixed, for example, by stitching to the first end connecter 12. The other end 46 of the first end belt 14 may be looped through the first buckle housing 32 in a manner such that the length of the first end belt 14 may be adjusted, for example, by extending or shortening the end 46. The first end belt 14 may be made of natural or synthetic fabric materials or combinations thereof, or other like and/or suitable materials.

Similarly, the second end belt 22 interconnects the second end connecter 24 and the second buckle housing 38. One end 48 of the second end belt 22 is affixed, for example, by stitching, to the second end connecter 24. The other end 50 of the second end belt 22 may be looped through the second buckle housing 38 in a manner such that the length of the second end belt 22 may be adjusted, for example, by extending or shortening the end 50. The second end belt 22 may be made of natural or synthetic fabric materials or combinations thereof, or other like and/or suitable materials.

The middle belt 18 interconnects the first buckle tongue 34 and the second buckle tongue 40. One end 52 of the middle belt 18 may be secured to the belt loop 54 of the first buckle tongue 34, and the other end 56 of the middle belt 18 may be secured to the belt loop 58 of the second buckle tongue 40. The middle belt 18 may be made of natural or synthetic fabric materials or combinations thereof, or other like and/or suitable materials.

The helmet attachment device 26 includes a first flexible piece 60 to be affixed to the top of a helmet, and a second flexible piece 62 affixed, for example by stitching, to the underside of the middle belt 18. The exposed surface of the second flexible piece 62 has one type of detachable or releasable fasteners, and the top side of the first flexible piece 60 has another type of detachable or releasable fasteners which are complementary to the type of detachable or releasable fasteners on the underside of the second flexible piece 62. For example, these fasteners may be Velcro® hook and loop type complementary fasteners.

The underside of the first flexible piece 60 is to be brought into contact with and affixed to the top of a helmet, for example, by adhesive material applied on the underside of the first flexible piece 60. A protective cover 64 may be used to protect the adhesive material applied on the underside of the first flexible piece 60 prior to affixing the first flexible piece 60 to the helmet. Once the first flexible piece 60 is ready to be affixed to the helmet, the protective cover 64 may be peeled off to expose the adhesive material. The protective cover 64 may be made of paper or other like and/or suitable materials.

Figure 2:
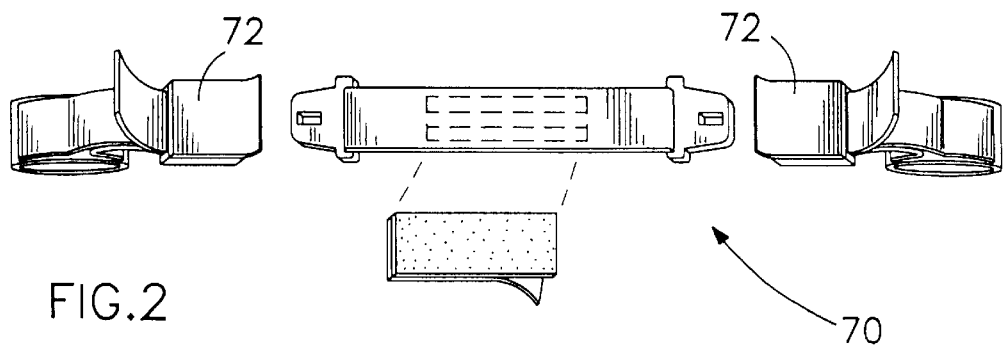
FIG. 2 is a perspective view of another preferred embodiment of the present invention helmet restraint and head and neck stabilizing system.

Referring to FIG. 2, there is shown at 70 another preferred embodiment of the present invention helmet restraint and head and neck stabilizing system. The only difference between the system 10 shown in FIG. 1 and the system 70 shown in FIG. 2 is the buckle tongue release mechanism. In FIG. 2, buckle release levers 72 are used to release the buckle tongue of the respective buckle.

Figure 3:
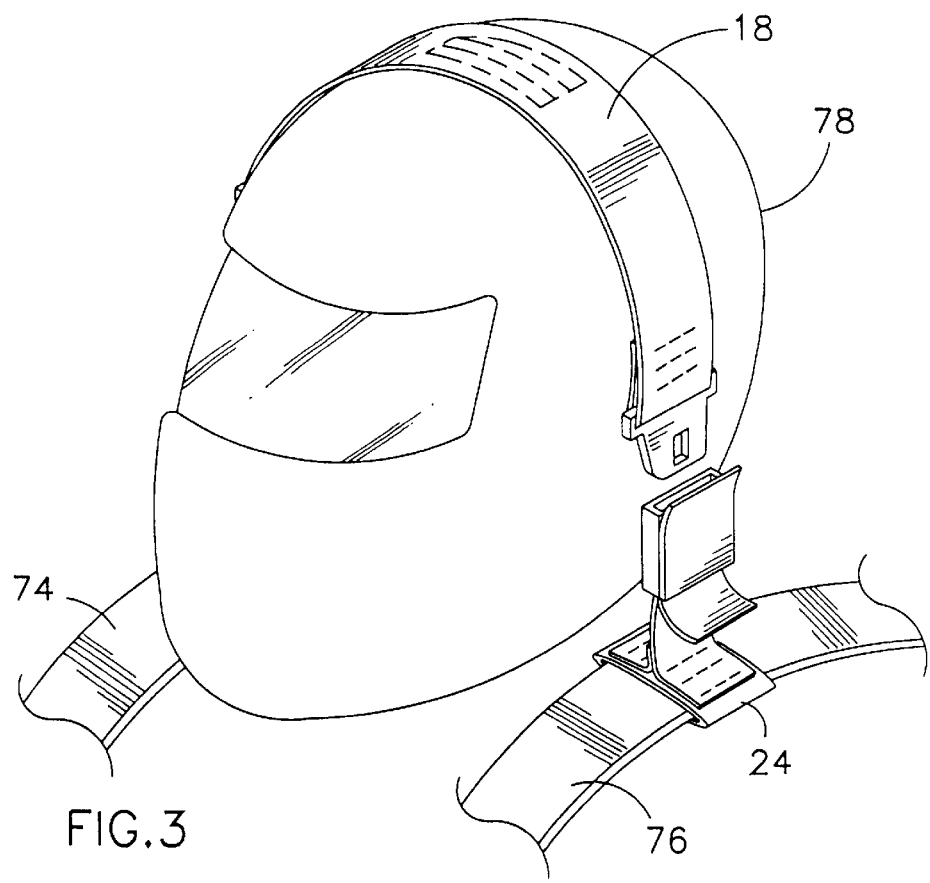
FIG. 3 is a perspective view demonstrating the present invention helmet restraint and head and neck stabilizing system used in conjunction with an existing shoulder belt system.

Referring to FIG. 3, there is shown the present invention helmet restraint and head and neck stabilizing system 70 used in conjunction with an existing shoulder belt system. A typical shoulder belt system used in race cars, speed boats, etc, may include two shoulder belts 74 and 76. Each of the end connecters 12 and 24 of the helmet restraint and head and neck stabilizing system 70 is attached to a respective shoulder belt 74 or 76 in a manner as previously discussed. The middle belt 18 is detachably or removably attached to the helmet 78 in a manner as previously discussed.

Figure 4:
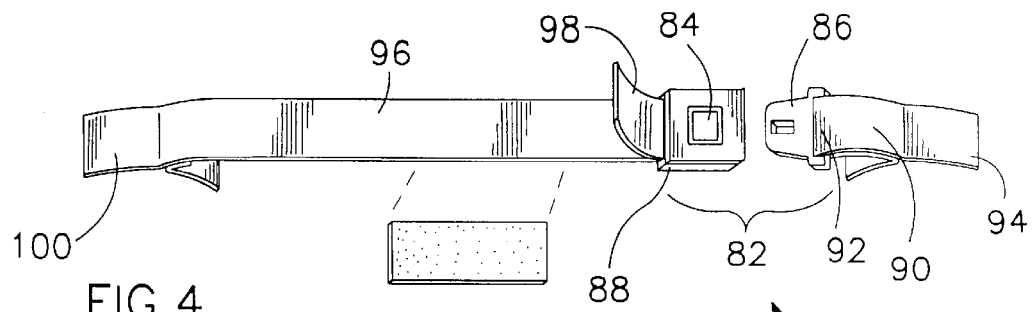
FIG. 4 is a perspective view of an alternative embodiment of the present invention helmet restraint and head and neck stabilizing system.
Figure 5:
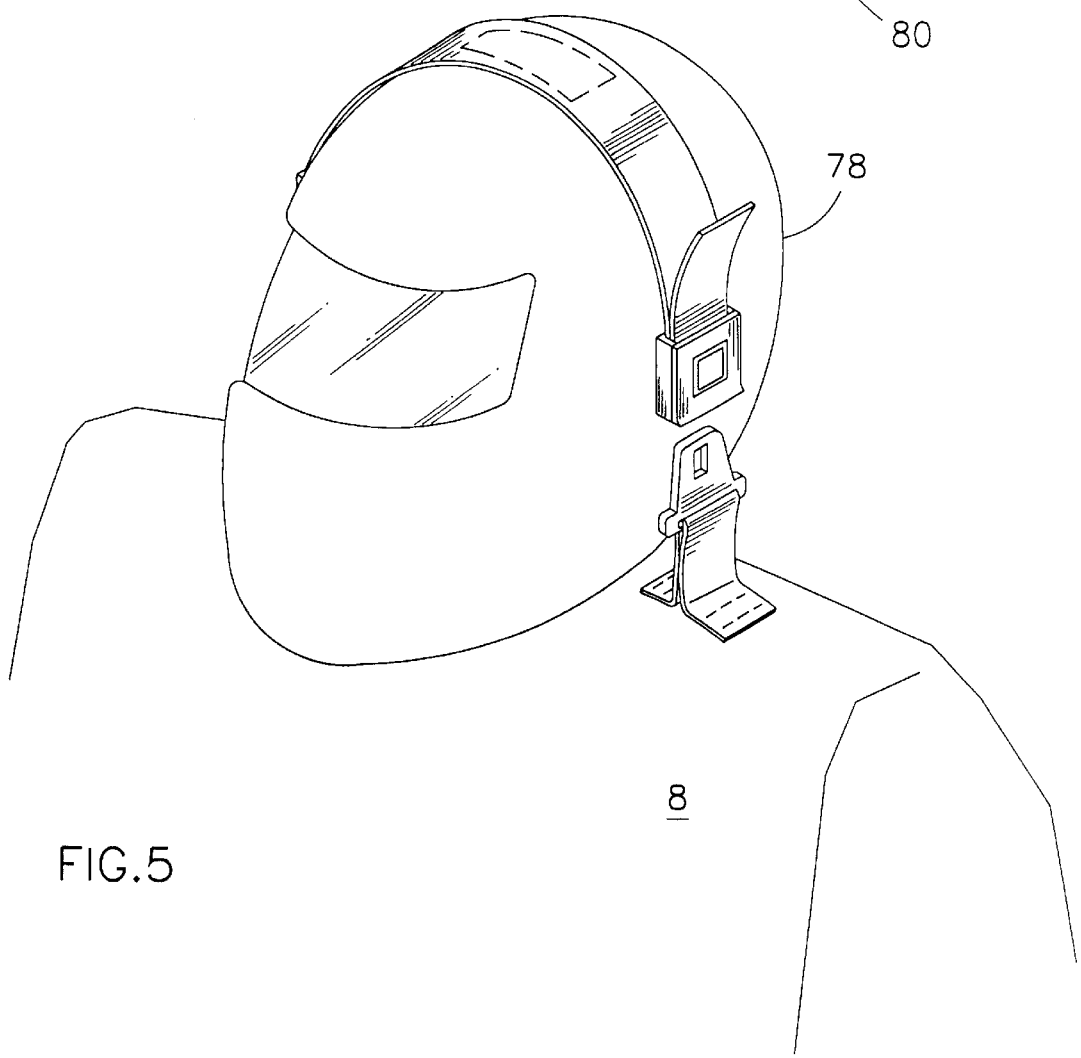
FIG. 5 is a perspective view demonstrating the present invention helmet restraint and head and neck stabilizing system used in conjunction with a suit.

Referring to FIGS. 4 and 5, there is shown at 80 an alternative embodiment of the present invention helmet restraint and head and neck stabilizing system used in conjunction with a suit 8 worn by a user without a shoulder belt system. In this embodiment, only one buckle 82 is used in this embodiment, so one of the end belts is removed. In addition, a different type of buckle tongue release button 84 is utilized to release the buckle tongue 86 from buckle housing 88. The remaining end belt 90 has one end tab 92 secured to the buckle tongue 86 and the other end 94 to be affixed, for example, by stitching, to a shoulder portion of the suit worn by the user. The middle belt 96 now has one end 98 connected to the buckle housing 88 in a manner allowing the length adjustment of the middle belt 96, and the other end tab 100 to be affixed, for example, by stitching, to another shoulder portion of the suit worn by the user.

It is noted that the main objective of the present invention is to provide a helmet restraint harness system for use by an operator or occupant of a vehicle or other motion apparatus wearing a helmet. Therefore, any alternative arrangements achieving such objective are within the scope of the present invention. For example, there may be different arrangements for the belt, as long as it is flexible and preferably adjustable in length. There may also be different arrangements for the buckle as long as it has a releasable engagement function, or different arrangement for connecting the belts instead of using buckles. There may further be different arrangements for either detachably or permanently attaching the belts to the helmet and the shoulder belt system or the user's suit.

There are many unique features and important advantages of the present invention helmet restraint and head and neck stabilizing system. The system may be used by any operator or occupant of land vehicles, boats, airplanes or other fast-moving apparatus. The user can quickly and easily affix the system to an existing helmet worn by the user. The system is a supplement to the existing shoulder belt system used by the user, and helps to prevent the user's head and neck from being injured by the violent movement upon a sudden impact.

The present invention helmet restraint and head and neck stabilizing system conforms to conventional forms of manufacture or any other conventional way known to one skilled in the art, and is of simple construction and is easy to produce and use. The present invention helmet restraint and head and neck stabilizing system may be made of the specific materials as mentioned hereinabove, or any other like or suitable materials.

Defined in detail, the present invention is a helmet restraint and head and neck stabilizing system for use with a helmet worn by an operator or occupant of a land vehicle, boat, airplane or other motion apparatus, in conjunction with a shoulder belt system or a suit worn by the operator or occupant. The helmet restraint and head and neck stabilizing system comprises: (a) a first end connecter, a second end connecter, a first releasable buckle, a second releasable buckle, a first flexible end belt, a second flexible end belt, and a flexible middle belt; (b) the first and second end connecters separately attachable to the shoulder belt system or the suit worn by the operator or occupant on opposite sides of the helmet worn by the operator or occupant; (c) the first end belt having one end affixed to the first end connecter and an opposite end connected to the first buckle; (d) the second end belt having one end affixed to the second end connecter and an opposite end connected to the second buckle; (e) a middle belt having one end connected to the first buckle and an opposite end connected to the second buckle; (f) at least one length of the first and second end belt and the middle belt being adjustable; and (g) means for removably attaching the middle belt to the helmet.

Defined alternatively, the present invention is a helmet restraint and head and neck stabilizing system for use with a helmet worn by an operator or occupant of a land vehicle, boat, airplane or other motion apparatus, in conjunction with a shoulder belt system or a suit worn by the operator or occupant. The helmet restraint and head and neck stabilizing system comprises: (a) a flexible end belt, a releasable buckle, and a flexible main belt; (b) the end belt having one end connected to the buckle and an opposite end for attachment to the shoulder belt system or the suit worn by the operator or occupant; (c) means for attaching the opposite end of the end belt to the shoulder belt system or the suit worn by the operator or occupant on one side of the helmet worn by the operator or occupant; (d) the main belt having one end connected to the buckle and an opposite end for attachment to the shoulder belt system or the suit worn by the operator or occupant on an opposite side of the helmet worn by the operator or occupant; (e) means for attaching the opposite end of the main belt to the shoulder belt system or the suit worn by the operator or occupant on the opposite side of the helmet worn by the operator or occupant; (f) at least one length of the end belt and the main belt being adjustable; and (g) means for removably attaching the main belt to the helmet.

Defined broadly, the present invention is a helmet restraint and head and neck stabilizing system for use with a helmet worn by an operator or occupant of a land vehicle, boat, airplane or other motion apparatus, comprising: (a) a flexible belt assembly; (b) means for attaching the belt assembly to the shoulder belt system or the suit worn by the operator or occupant; and (c) means for attaching the belt assembly to the helmet.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A helmet restraint and head and neck stabilizing system for use with a helmet worn by an operator or occupant of a land vehicle, boat, airplane or other motion apparatus, in conjunction with a shoulder belt system or a suit worn by the operator or occupant, the helmet restraint and head and neck stabilizing system comprising:
   a. a flexible belt assembly;
   b. means for attaching said belt assembly to said shoulder belt system or said suit worn by said operator or occupant;
   c. means for attaching said belt assembly to said helmet;
   d. said belt system having at least two belts connectable by a releasable connecting means.

2. The helmet restraint and head and neck stabilizing system defined in claim 1, wherein said flexible belt assembly has an adjustable length.

3. The helmet restraint and head and neck stabilizing system defined in claim 1, wherein said means for attaching said belt assembly to said shoulder belt system or said suit worn by said operator or occupant comprises a loop device for attachment to said shoulder belt system.

4. The helmet restraint and head and neck stabilizing system defined in claim 1, wherein attaching said belt assembly to said shoulder belt system or said suit worn by said operator or occupant comprises a tab device for attachment to said suit worn by said operator or occupant.

5. The helmet restraint and head and neck stabilizing system defined in claim 1, wherein said releasable connecting means comprises a buckle.

6. The helmet restraint and head and neck stabilizing system defined in claim 5, wherein said buckle comprises a buckle housing, a buckle tongue releasably insertable into the buckle housing, and a buckle tongue release mechanism.

7. The helmet restraint and head and neck stabilizing system defined in claim 1, wherein said means for attaching said belt assembly to said helmet comprises a fastener member removably attachable to said helmet, and a complementary fastener member affixed to said belt assembly.

8. The helmet restraint and head and neck stabilizing system defined in claim 7, wherein said fastener member removably attachable to said helmet has a top side for fastening with said complementary fastener member, and a bottom side for removable attachment to said helmet.

9. The helmet restraint and head and neck stabilizing system defined in claim 7, wherein said complementary fastener member affixed to said belt assembly has a top side for affixation to said belt assembly, and a bottom side for fastening with said fastener member removably attachable to said helmet.

10. The helmet restraint and head and neck stabilizing system defined in claim 7, wherein one of said fastener members has hook type filamentary fasteners, and the other one of said fastener members has complementary loop type filamentary fasteners.

11. The helmet restraint and head and neck stabilizing system defined in claim 7, wherein said complementary fastener member is affixed to said belt assembly by an adhesive material.

12. The helmet restraint and head and neck stabilizing system defined in claim 11, further comprising a protective cover for protecting said adhesive material prior to use.

13. A helmet restraint and head and neck stabilizing system for use with a helmet worn by an operator or occupant of a land vehicle, boat, airplane or other motion apparatus, in conjunction with a shoulder belt system or a suit worn by the operator or occupant, the helmet restraint and head and neck stabilizing system comprising:
  a. a first end connecter, a second end connecter, a first releasable buckle, a second releasable buckle, a first flexible end belt, a second flexible end belt, and a flexible middle belt;
  b. said first and second end connecters separately attachable to said shoulder belt system or said suit worn by said operator or occupant on opposite sides of said helmet worn by said operator or occupant;
  c. said first end belt having one end affixed to said first end connecter and an opposite end connected to said first buckle;
  d. said second end belt having one end affixed to said second end connecter and an opposite end connected to said second buckle;
  e. said middle belt having one end connected to said first buckle and an opposite end connected to said second buckle;
  f. at least one length of said first and second end belt and said middle belt being adjustable; and
  g. means for removably attaching said middle belt to said helmet.

14. The helmet restraint and head and neck stabilizing system defined in claim 13, wherein at least one of said first and second end connecters comprises a loop device for attachment to said shoulder belt system.

15. The helmet restraint and head and neck stabilizing system defined in claim 13, wherein at least one of said first and second end connecters comprises a tab device for attachment to said suit worn by said operator or occupant.

16. The helmet restraint and head and neck stabilizing system defined in claim 13, wherein said first and second buckle each comprises a buckle housing, a buckle tongue releasably insertable into the buckle housing, and a buckle tongue release mechanism.

17. The helmet restraint and head and neck stabilizing system defined in claim 13, wherein said means for removably attaching said middle belt to said helmet comprises a fastener member removably attachable to said helmet, and a complementary fastener member affixed to said middle belt.

18. The helmet restraint and head and neck stabilizing system defined in claim 17, wherein said fastener member removably attachable to said helmet has a top side for fastening with said complementary fastener member, and a bottom side for removable attachment to said helmet.

19. The helmet restraint and head and neck stabilizing system defined in claim 17, wherein said complementary fastener member affixed to said middle belt has a top side for affixation to said middle belt, and a bottom side for fastening with said fastener member removably attachable to said helmet.

20. The helmet restraint and head and neck stabilizing system defined in claim 17, wherein one of said fastener members has hook type filamentary fasteners, and the other one of said fastener members has complementary loop type filamentary fasteners.

21. The helmet restraint and head and neck stabilizing system defined in claim 17, wherein said complementary fastener member is affixed to said middle belt by an adhesive material.

22. The helmet restraint and head and neck stabilizing system defined in claim 21, further comprising a protective cover for protecting said adhesive material prior to use.

23. A helmet restraint and head and neck stabilizing system for use with a helmet worn by an operator or occupant of a land vehicle, boat, airplane or other motion apparatus, in conjunction with a shoulder belt system or a suit worn by the operator or occupant, the helmet restraint and head and neck stabilizing system comprising:
  a. a flexible end belt, a releasable buckle, and a flexible main belt;
  b. said end belt having one end connected to said buckle and an opposite end for attachment to said shoulder belt system or said suit worn by said operator or occupant;
  c. means for attaching said opposite end of said end belt to said shoulder belt system or said suit worn by said operator or occupant on one side of said helmet worn by said operator or occupant;
  d. said main belt having one end connected to said buckle and an opposite end for attachment to said shoulder belt system or said suit worn by said operator or occupant on an opposite side of said helmet worn by said operator or occupant;
  e. means for attaching said opposite end of said main belt to said shoulder belt system or said suit worn by said operator or occupant on said opposite side of said helmet worn by said operator or occupant;
  f. at least one length of said end belt and said main belt being adjustable; and
  g. means for removably attaching said main belt to said helmet.

24. The helmet restraint and head and neck stabilizing system defined in claim 23, wherein said end belt attaching means comprises a loop device for attachment to said shoulder belt system.

25. The helmet restraint and head and neck stabilizing system defined in claim 23, wherein said end belt attaching means comprises a tab device for attachment to said suit worn by said operator or occupant.

26. The helmet restraint and head and neck stabilizing system defined in claim 23, wherein said main belt attaching means comprises a loop device for attachment to said shoulder belt system.

27. The helmet restraint and head and neck stabilizing system defined in claim 23, wherein said main belt attaching means comprises a tab device for attachment to said suit worn by said operator or occupant.

28. The helmet restraint and head and neck stabilizing system defined in claim 23, wherein said buckle comprises a buckle housing, a buckle tongue releasably insertable into the buckle housing, and a buckle tongue release mechanism.

29. The helmet restraint and head and neck stabilizing system defined in claim 23, wherein said means for removably attaching said main belt to said helmet comprises a fastener member removably attachable to said helmet, and a complementary fastener member affixed to said main belt.

30. The helmet restraint and head and neck stabilizing system defined in claim 29, wherein said fastener member removably attachable to said helmet has a top side for fastening with said complementary fastener member, and a bottom side for removable attachment to said helmet.

31. The helmet restraint and head and neck stabilizing system defined in claim 29, wherein said complementary fastener member affixed to said main belt ha s a top side for affixation to said main belt, and a bottom side for fastening with said fastener member removably attachable to said helmet.

32. The helmet restraint and head and neck stabilizing system defined in claim 29, wherein one of said fastener members has hook type filamentary fasteners, and the other one of said fastener members has complementary loop type filamentary fasteners.

33. The helmet restraint and head and neck stabilizing system defined in claim 29, wherein said complementary fastener member is affixed to said main belt by an adhesive material.

34. The helmet restraint and head and neck stabilizing system defined in claim 33, further comprising a protective cover for protecting said adhesive material prior to use.

35. A helmet restraint and head and neck stabilizing system for use with a helmet worn by an operator or occupant of a land vehicle, boat, airplane or other motion apparatus, in conjunction with a shoulder belt system or a suit worn by the operator or occupant, the helmet restraint and head and neck stabilizing system comprising:
   a. a flexible belt assembly;
   b. means for attaching said belt assembly to said shoulder belt system or said suit worn by said operator or occupant;
   c. means for attaching said belt assembly to said helmet, including a fastener member removably attachable to said helmet, and a complementary fastener member affixed to said belt assembly; and
   d. said fastener member removably attachable to said helmet has a top side for fastening with said complementary fastener member, and a bottom side for removable attachment to said helmet.

36. The helmet restraint and head and neck stabilizing system defined in claim 35, wherein said flexible belt assembly has an adjustable length.

37. The helmet restraint and head and neck stabilizing system defined in claim 35, wherein said means for attaching said belt assembly to said shoulder belt system or said suit worn by said operator or occupant comprises a loop device for attachment to said shoulder belt system.

38. The helmet restraint and head and neck stabilizing system defined in claim 35, wherein said means for attaching said belt assembly to said shoulder belt system or said suit worn by said operator or occupant comprises a tab device for attachment to said suit worn by said operator or occupant.

39. The helmet restraint and head and neck stabilizing system defined in claim 35, wherein said belt system comprises at least two belts connectable by a releasable connecting means.

40. The helmet restraint and head and neck stabilizing system defined in claim 39, wherein said releasable connecting means comprises a buckle.

41. The helmet restraint and head and neck stabilizing system defined in claim 40, wherein said buckle comprises a buckle housing, a buckle tongue releasably insertable into the buckle housing, and a buckle tongue release mechanism.

42. The helmet restraint and head and neck stabilizing system defined in claim 35, wherein said complementary fastener member affixed to said belt assembly has a top side for affixation to said belt assembly, and a bottom side for fastening with said fastener member removably attachable to said helmet.

43. The helmet restraint and head and neck stabilizing system defined in claim 35, wherein one of said fastener members has hook type filamentary fasteners, and the other one of said fastener members has complementary loop type filamentary fasteners.

44. The helmet restraint and head and neck stabilizing system defined in claim 35, wherein said complementary fastener member is affixed to said belt assembly by an adhesive material.

45. The helmet restraint and head and neck stabilizing system defined in claim 44, further comprising a protective cover for protecting said adhesive material prior to use.

46. A helmet restraint and head and neck stabilizing system for use with a helmet worn by an operator or occupant of a land vehicle, boat, airplane or other motion apparatus, in conjunction with a shoulder belt system or a suit worn by the operator or occupant, the helmet restraint and head and neck stabilizing system comprising:
   a. a flexible belt assembly;
   b. means for attaching said belt assembly to said shoulder belt system or said suit worn by said operator or occupant;
   c. means for attaching said belt assembly to said helmet, including a fastener member removably attachable to said helmet, and a complementary fastener member affixed to said belt assembly; and
   d. said complementary fastener member affixed to said belt assembly has a top side for affixation to said belt assembly, and a bottom side for fastening with said fastener member removably attachable to said helmet.

47. The helmet restraint and head and neck stabilizing system defined in claim 46, wherein said flexible belt assembly has an adjustable length.

48. The helmet restraint and head and neck stabilizing system defined in claim 46, wherein said means for attaching said belt assembly to said shoulder belt system or said suit worn by said operator or occupant comprises a loop device for attachment to said shoulder belt system.

49. The helmet restraint and head and neck stabilizing system defined in claim 46, wherein said means for attaching said belt assembly to said shoulder belt system or said suit worn by said operator or occupant comprises a tab device for attachment to said suit worn by said operator or occupant.

50. The helmet restraint and head and neck stabilizing system defined in claim 46, wherein said belt system comprises at least two belts connectable by a releasable connecting means.

51. The helmet restraint and head and neck stabilizing system defined in claim 50, wherein said releasable connecting means comprises a buckle.

52. The helmet restraint and head and neck stabilizing system defined in claim 51, wherein said buckle comprises a buckle housing, a buckle tongue releasably insertable into the buckle housing, and a buckle tongue release mechanism.

53. The helmet restraint and head and neck stabilizing system defined in claim 46, wherein said fastener member removably attachable to said helmet has a top side for fastening with said complementary fastener member, and a bottom side for removable attachment to said helmet.

54. The helmet restraint and head and neck stabilizing system defined in claim 46, wherein one of said fastener members has hook type filamentary fasteners, and the other one of said fastener members has complementary loop type filamentary fasteners.

55. The helmet restraint and head and neck stabilizing system defined in claim 46, wherein said complementary fastener member is affixed to said belt assembly by an adhesive material.

56. The helmet restraint and head and neck stabilizing system defined in claim 55, further comprising a protective cover for protecting said adhesive material prior to use.

57. A helmet restraint and head and neck stabilizing system for use with a helmet worn by an operator or occupant of a land vehicle, boat, airplane or other motion apparatus, in conjunction with a shoulder belt system or a suit worn by the operator or occupant, the helmet restraint and head and neck stabilizing system comprising:
   a. a flexible belt assembly;
   b. means for attaching said belt assembly to said shoulder belt system or said suit worn by said operator or occupant;
   c. means for attaching said belt assembly to said helmet, including a fastener member removably attachable to said helmet, and a complementary fastener member affixed to said belt assembly; and
   d. one of said fastener members has hook type filamentary fasteners, and the other one of said fastener members has complementary loop type filamentary fasteners.

58. The helmet restraint and head and neck stabilizing system defined in claim 57, wherein said flexible belt assembly has an adjustable length.

59. The helmet restraint and head and neck stabilizing system defined in claim 57, wherein said means for attaching said belt assembly to said shoulder belt system or said suit worn by said operator or occupant comprises a loop device for attachment to said shoulder belt system.

60. The helmet restraint and head and neck stabilizing system defined in claim 57, wherein said means for attaching said belt assembly to said shoulder belt system or said suit worn by said operator or occupant comprises a tab device for attachment to said suit worn by said operator or occupant.

61. The helmet restraint and head and neck stabilizing system defined in claim 57, wherein said belt system comprises at least two belts connectable by a releasable connecting means.

62. The helmet restraint and head and neck stabilizing system defined in claim 61, wherein said releasable connecting means comprises a buckle.

63. The helmet restraint and head and neck stabilizing system defined in claim 62, wherein said buckle comprises a buckle housing, a buckle tongue releasably insertable into the buckle housing, and a buckle tongue release mechanism.

64. The helmet restraint and head and neck stabilizing system defined in claim 57, wherein said fastener member removably attachable to said helmet has a top side for fastening with said complementary fastener member, and a bottom side for removable attachment to said helmet.

65. The helmet restraint and head and neck stabilizing system defined in claim 57, wherein said complementary fastener member affixed to said belt assembly has a top side for affixation to said belt assembly, and a bottom side for fastening with said fastener member removably attachable to said helmet.

66. The helmet restraint and head and neck stabilizing system defined in claim 57, wherein said complementary fastener member is affixed to said belt assembly by an adhesive material.

67. The helmet restraint and head and neck stabilizing system defined in claim 66, further comprising a protective cover for protecting said adhesive material prior to use.

68. A helmet restraint and head and neck stabilizing system for use with a helmet worn by an operator or occupant of a land vehicle, boat, airplane or other motion apparatus, in conjunction with a shoulder belt system or a suit worn by the operator or occupant, the helmet restraint and head and neck stabilizing system comprising:
   a. a flexible belt assembly;
   b. means for attaching said belt assembly to said shoulder belt system or said suit worn by said operator or occupant;
   c. means for attaching said belt assembly to said helmet, including a fastener member removably attachable to said helmet, and a complementary fastener member affixed to said belt assembly; and
   d. said complementary fastener member affixed to said belt assembly by an adhesive material.

69. The helmet restraint and head and neck stabilizing system defined in claim 68, wherein said flexible belt assembly has an adjustable length.

70. The helmet restraint and head and neck stabilizing system defined in claim 68, wherein said means for attaching said belt assembly to said shoulder belt system or said suit worn by said operator or occupant comprises a loop device for attachment to said shoulder belt system.

71. The helmet restraint and head and neck stabilizing system defined in claim 68, wherein said means for attaching said belt assembly to said shoulder belt system or said suit worn by said operator or occupant comprises a tab device for attachment to said suit worn by said operator or occupant.

72. The helmet restraint and head and neck stabilizing system defined in claim 68, wherein said belt system comprises at least two belts connectable by a releasable connecting means.

73. The helmet restraint and head and neck stabilizing system defined in claim 72, wherein said releasable connecting means comprises a buckle.

74. The helmet restraint and head and neck stabilizing system defined in claim 73, wherein said buckle comprises a buckle housing, a buckle tongue releasably insertable into the buckle housing, and a buckle tongue release mechanism.

75. The helmet restraint and head and neck stabilizing system defined in claim 68, wherein said fastener member removably attachable to said helmet has a top side for fastening with said complementary fastener member, and a bottom side for removable attachment to said helmet.

76. The helmet restraint and head and neck stabilizing system defined in claim 68, wherein said complementary fastener member affixed to said belt assembly has a top side for affixation to said belt assembly, and a bottom side for fastening with said fastener member removably attachable to said helmet.

77. The helmet restraint and head and neck stabilizing system defined in claim 68, wherein one of said fastener members has hook type filamentary fasteners, and the other one of said fastener members has complementary loop type filamentary fasteners.

78. The helmet restraint and head and neck stabilizing system defined in claim 68, further comprising a protective cover for protecting said adhesive material prior to use.

* * * * *